(12) United States Patent
Fukui

(10) Patent No.: US 11,703,019 B2
(45) Date of Patent: Jul. 18, 2023

(54) INTAKE DEVICE

(71) Applicant: SUZUKI MOTOR CORPORATION, Hamamatsu (JP)

(72) Inventor: Akihito Fukui, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 17/850,494

(22) Filed: Jun. 27, 2022

(65) Prior Publication Data

US 2023/0025823 A1 Jan. 26, 2023

(30) Foreign Application Priority Data

Jul. 26, 2021 (JP) .................... 2021-121611

(51) Int. Cl.
*F02M 35/10* (2006.01)
*F02M 35/16* (2006.01)

(52) U.S. Cl.
CPC .. *F02M 35/1038* (2013.01); *F02M 35/10321* (2013.01); *F02M 35/162* (2013.01)

(58) Field of Classification Search
CPC ......... F02M 35/1038; F02M 35/10321; F02M 35/162
See application file for complete search history.

(56) References Cited

U.S. PATENT DOCUMENTS

| 2013/0213338 | A1* | 8/2013 | Lim ................. | F02M 35/10144 |
| | | | | 123/184.21 |
| 2014/0041614 | A1* | 2/2014 | Koyama ............. | F02M 35/162 |
| | | | | 123/184.21 |
| 2015/0377193 | A1* | 12/2015 | Smith ................ | F02M 35/1038 |
| | | | | 73/756 |
| 2019/0316552 | A1* | 10/2019 | Suzuki ................ | F02M 35/04 |

FOREIGN PATENT DOCUMENTS

JP    6047336 B2    11/2016

* cited by examiner

*Primary Examiner* — Syed O Hasan
(74) *Attorney, Agent, or Firm* — Stein IP, LLC

(57) ABSTRACT

There is provided an intake device, in which an air cleaner is disposed behind an engine and which is configured such that air is introduced from the air cleaner to the engine through an intake passage. The intake device includes: a pressure sensor configured to detect a pressure in the intake passage; a throttle body that forms an upstream side of the intake passage; and an intake pipe that forms a downstream side of the intake passage. An attachment portion to which the pressure sensor is attached is formed on an outer peripheral surface of the intake pipe.

6 Claims, 7 Drawing Sheets

INTAKE DEVICE

CROSS-REFERENCE TO RELATED APPLICATIONS

This application is based on Japanese Patent Application No. 2021-121611 filed on Jul. 26, 2021, the contents of which are incorporated herein by way of reference.

TECHNICAL FIELD

The present invention relates to an intake device.

BACKGROUND

An intake device of a straddle-type vehicle or the like includes a pressure sensor that detects a pressure (intake pressure) in an intake passage from an air cleaner to an engine. As an intake device, a device in which a pressure sensor is supported by an air cleaner is known (for example, see Patent Literature 1). In the intake device described in Patent Literature 1, the air cleaner is disposed above an engine, and a throttle body is disposed between the air cleaner and the engine. A support portion extends from the air cleaner, and the pressure sensor is attached to the support portion. The pressure sensor and the throttle body are connected by a hose, and the pressure in the intake passage of the throttle body is detected by the pressure sensor.
Patent Literature 1: Japanese Patent No. 6047336

However, in a case of a model in which the air cleaner is disposed behind the engine, another intake system component is disposed in a peripheral space of the air cleaner. Therefore, it is difficult to assemble the pressure sensor to the air cleaner, and it is also difficult to secure a gap between another intake system component and the pressure sensor.

The present invention is made in view of the above problem, and an object of the present invention is to provide an intake device capable of improving assemblability of a pressure sensor and securing an arrangement space for the pressure sensor.

SUMMARY

According to an aspect of the present invention, there is provided an intake device, in which an air cleaner is disposed behind an engine and which is configured such that air is introduced from the air cleaner to the engine through an intake passage. The intake device includes: a pressure sensor configured to detect a pressure in the intake passage; a throttle body that forms an upstream side of the intake passage; and an intake pipe that forms a downstream side of the intake passage. An attachment portion to which the pressure sensor is attached is formed on an outer peripheral surface of the intake pipe.

DESCRIPTION OF EMBODIMENTS

In an intake device according to one aspect of the present invention, an air cleaner is disposed behind an engine and air is introduced from the air cleaner to the engine through an intake passage. The intake device is provided with a pressure sensor that detects a pressure in the intake passage. An upstream side of the intake passage is formed by a throttle body, and a downstream side of the intake passage is formed by an intake pipe. An attachment portion to which the pressure sensor is attached is formed on an outer peripheral surface of the intake pipe. By assembling the intake pipe to the engine in a state where the pressure sensor is attached to the intake pipe, the pressure sensor and the intake pipe can be easily assembled to the engine. In addition, since the pressure sensor is attached to the intake pipe, it is possible to sufficiently secure a gap between the pressure sensor and another intake system component even in a narrow space between the engine and the air cleaner.

Embodiment

Figure 1:
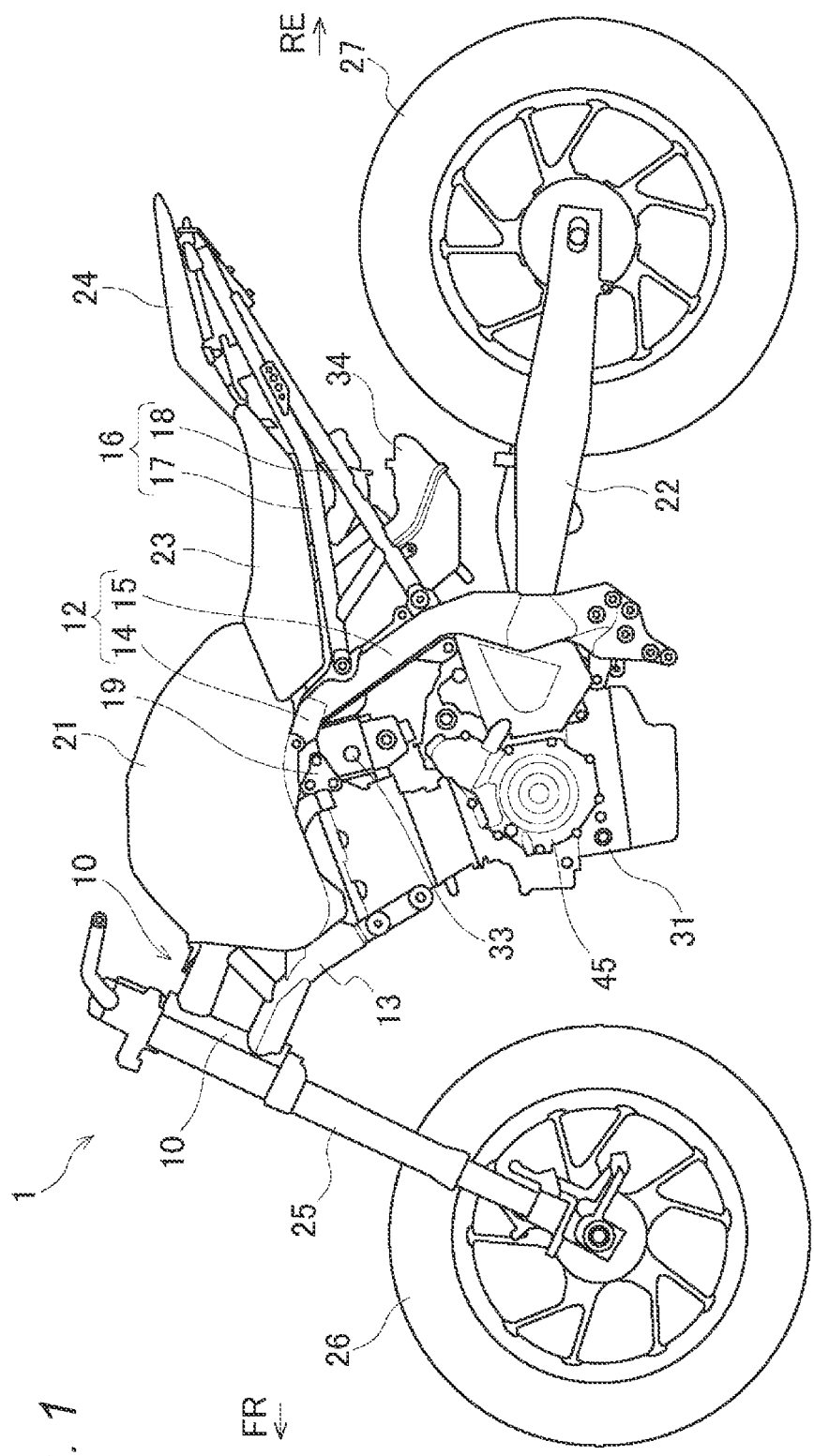
FIG. 1 is a left side view of a straddle-type vehicle according to an embodiment.

Hereinafter, an embodiment will be described in detail with reference to the accompanying drawings. FIG. 1 is a left side view of a straddle-type vehicle according to the present embodiment. In addition, in the drawings to be described later, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 is formed by mounting various components such as an engine 31 and an electrical system on a diamond-type vehicle body frame 10 formed of a pipe and a sheet metal. The vehicle body frame 10 includes a pair of main frames 12 that are branched off from a head pipe 11 to the left and right and extend rearward, and a pair of down frames 13 that are branched off from the head pipe 1I to the left and right and extend downward. A rear portion of the engine 31 is supported by the pair of main frames 12, and a front portion of the engine 31 is supported by the pair of down frames 13. By supporting the engine 31 with the vehicle body frame 10, the rigidity of an entire vehicle is secured.

A front side portion of the main frame 12 is a tank rail 14 located above the engine 31, and a fuel tank 21 is supported from below by the tank rail 14. A rear side portion of the main frame 12 is a body frame 15 located behind the engine 31, and a swing arm 22 is swingably supported by a lower half portion of the body frame 15. A seat rail 16 including an upper rail 17 and a lower rail 18 is attached to an upper half portion of the body frame 15. A rider seat 23 and a pillion seat 24 are supported on an upper portion of the upper rail 17 at the rear of the fuel tank 21.

A pair of front forks 25 is steerably supported by the head pipe 11 via a steering shaft (not shown). A front wheel 26 is rotatably supported by lower portions of the front forks 25, and an upper portion of the front wheel 26 is covered with a front fender (not shown). The swing arm 22 extends rearward from the body frame 15. A rear wheel 27 is rotatably supported at a rear end of the swing arm 22, and an upper side of the rear wheel 27 is covered with a rear fender (not shown). The engine 31 is coupled to the rear wheel 27 via a chain drive type transmission mechanism, and power from the engine 31 is transmitted to the rear wheel 27 via the transmission mechanism.

An air cleaner 34 is connected to the rear of the engine 31 via an intake pipe 32 (see FIG. 2) and a throttle body 33. The air cleaner 34 is disposed below the rider seat 23 and inside a pair of seat rails 16. An intake passage for introducing air from the air cleaner 34 to the engine 31 is formed in the throttle body 33 and the intake pipe 32, and a pressure in the intake passage is detected by a pressure sensor 35 (see FIG. 2). There is a demand for an arrangement structure of the pressure sensor 35 which is effective in a model in which the air cleaner 34 is disposed behind the engine 31 and even in a model whose vehicle width is narrow and in which a two-cylinder engine is mounted.

In a model whose vehicle width is narrow and in which the air cleaner 34 is disposed behind the engine 31, the peripheries of the air cleaner 34 and the engine 31 are mixed by various intake system components. Therefore, it is difficult to secure an empty space for disposing the pressure sensor 35 such that the pressure sensor 35 does not interfere with other intake system components. In addition, if a gap between the pressure sensor 35 and other intake system components is narrow, it is difficult to assemble the pressure sensor 35. Therefore, in the intake device of the present embodiment, by using the empty space on the upper surface of the intake pipe 32, the intake pipe 32 can be assembled to the engine 31 in a state where the pressure sensor 35 is attached to the intake pipe 32.

Figure 2:
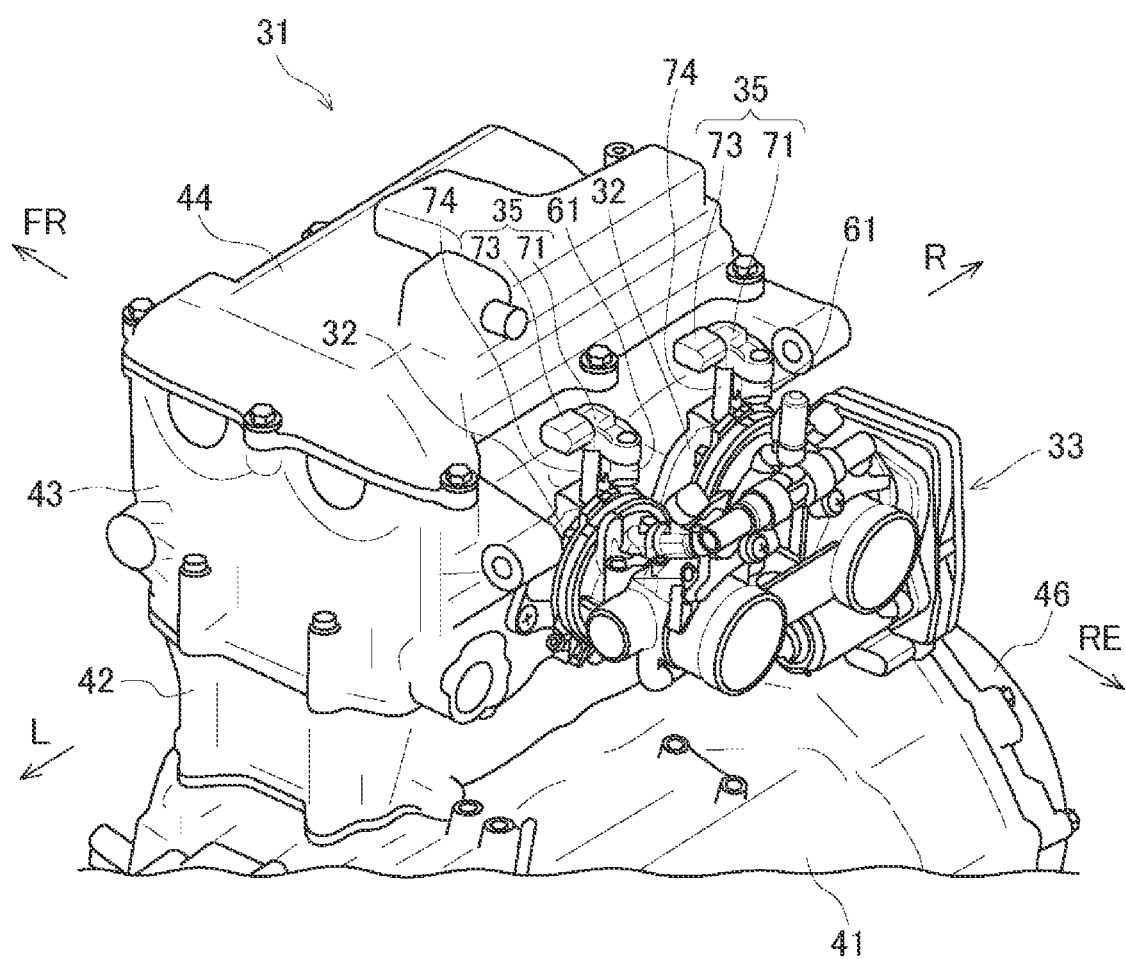
FIG. 2 is a perspective view of an engine according to the present embodiment.
Figure 3:
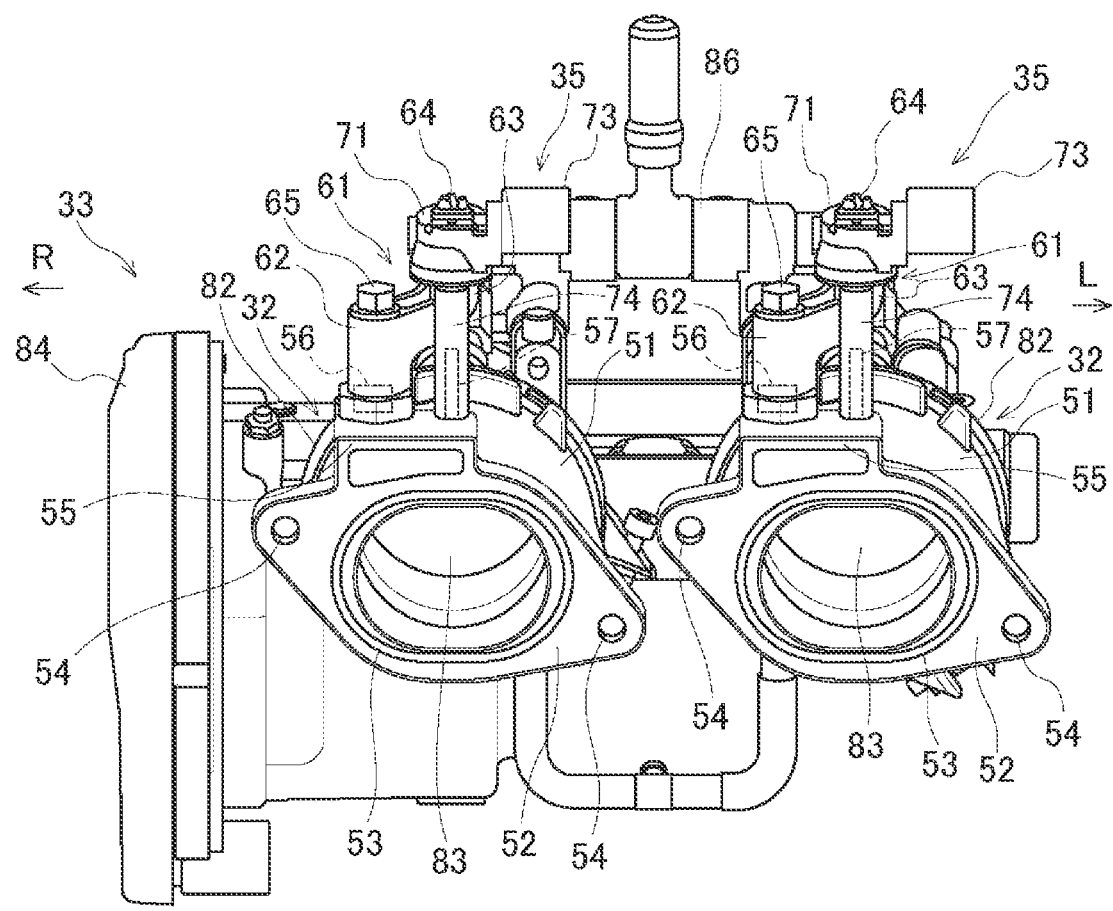
FIG. 3 is a front view of an intake device according to the present embodiment.
Figure 4:
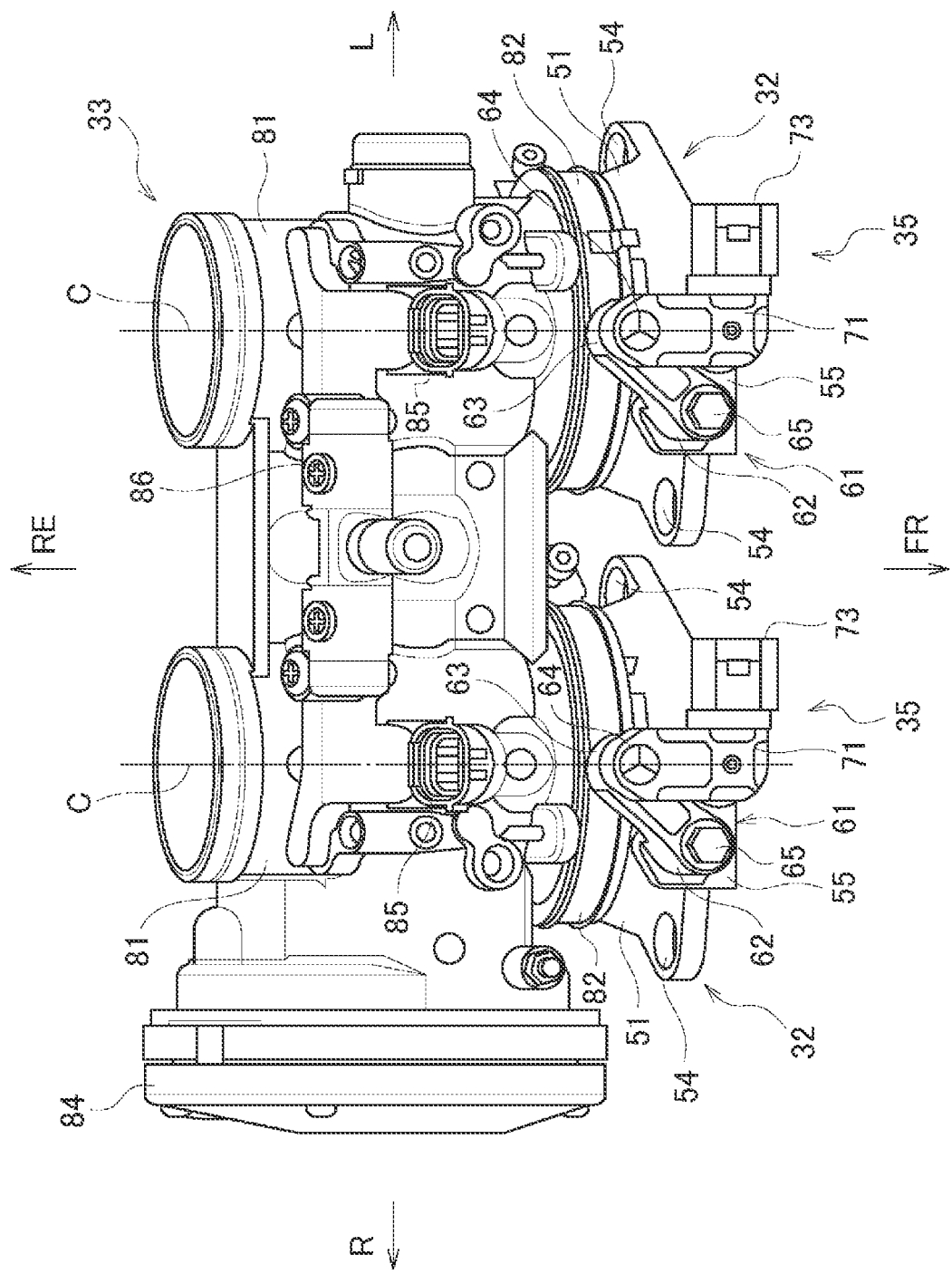
FIG. 4 is a top view of the intake device according to the present embodiment.
Figure 5:
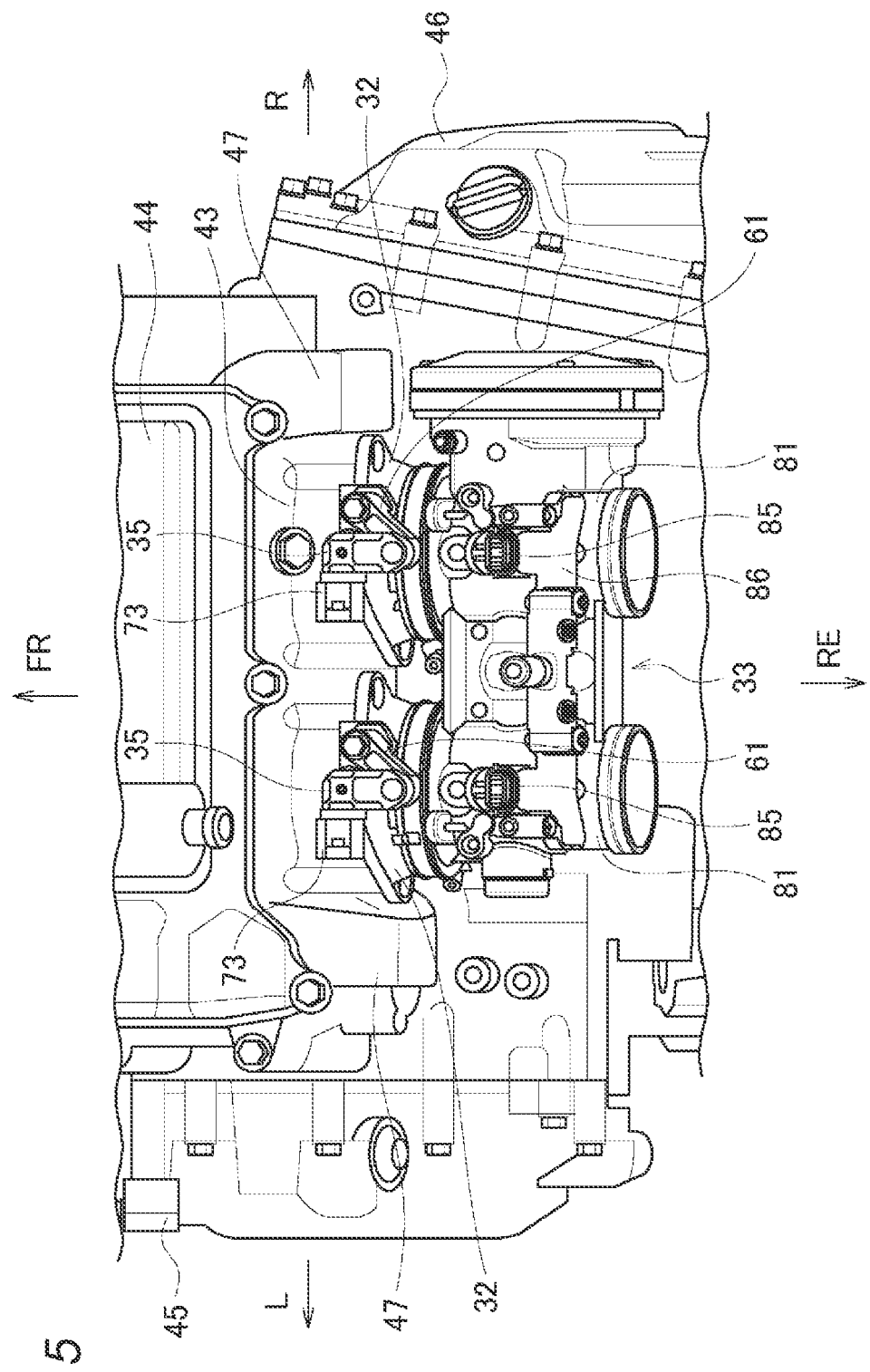
FIG. 5 is a top view showing a positional relationship between an engine suspension portion and a pressure sensor according to the present embodiment.
Figure 6:
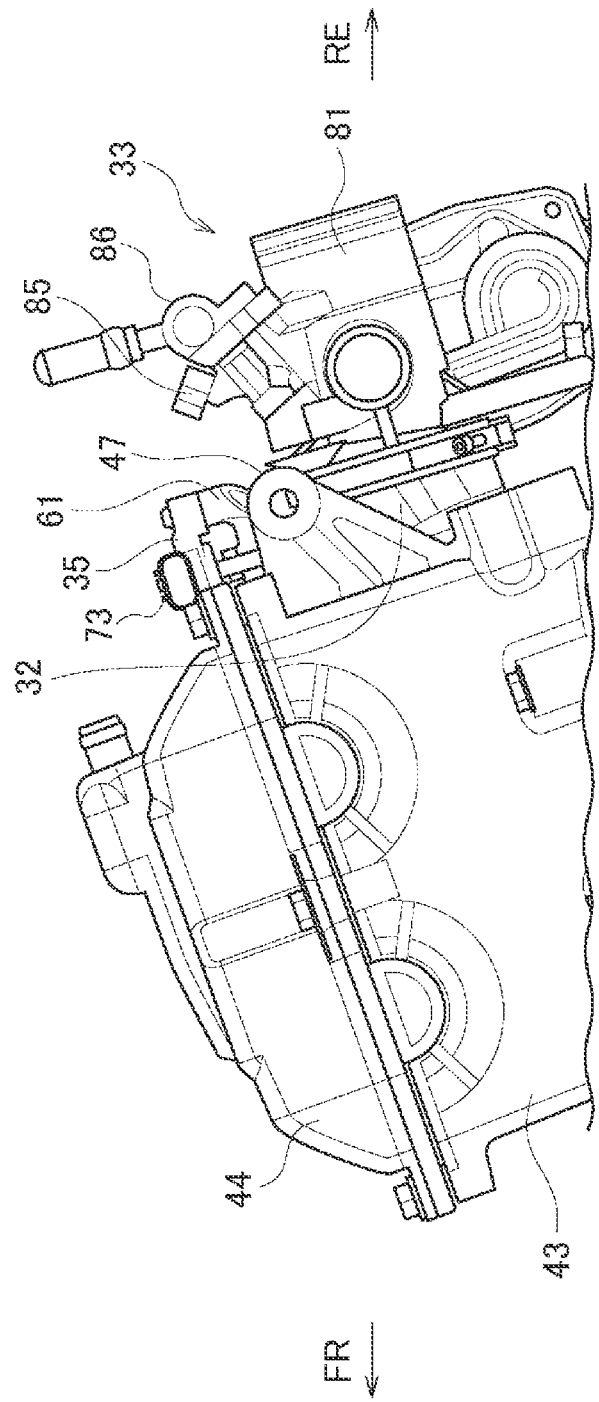
FIG. 6 is a side view showing the positional relationship between the engine suspension portion and the pressure sensor according to the present embodiment.

The intake device will be described with reference to FIGS. 2 to 6. FIG. 2 is a perspective view of the engine according to the present embodiment. FIG. 3 is a front view of the intake device according to the present embodiment. FIG. 4 is a top view of the intake device according to the present embodiment. FIG. 5 is a top view showing a positional relationship between an engine suspension portion and a pressure sensor according to the present embodiment. FIG. 6 is a side view showing the positional relationship between the engine suspension portion and the pressure sensor according to the present embodiment.

As shown in FIG. 2, the engine 31 is a two-cylinder engine, and includes a crankcase 41 having an upper-lower divided structure. A cylinder 42, a cylinder head 43, and a cylinder head cover 44 are attached to an upper portion of the crankcase 41. A magneto cover 45 (see FIG. 1) that covers a magneto (not shown) from a side is attached to a left side surface of the crankcase 41. A clutch cover 46 that covers a clutch (not shown) from the side is attached to a right side surface of the crankcase 41. The throttle body 33 is connected to a rear surface of the cylinder head 43 via a pair of intake pipes 32.

The air cleaner 34 (see FIG. 1) is connected to an upstream side (rear side) of the throttle body 33. As described above, the throttle body 33 and the pair of intake pipes 32 are provided between the air cleaner 34 and the cylinder head 43. An upstream side of a pair of intake passages is formed inside the throttle body 33, and a downstream side of the pair of intake passages is formed inside the pair of intake pipes 32. The pair of intake passages is formed by the throttle body 33 and the pair of intake pipes 32, and air is introduced from the air cleaner 34 to a pair of intake ports of the cylinder head 43 through the pair of intake passages.

Arm members 61 are attached to the upper surfaces of the pair of intake pipes 32, and the pressure sensor 35 is supported above the intake pipes 32 by the arm members 61. The inside of a case 71 of the pressure sensor 35 is connected to the intake passage of the intake pipe 32 via a hose 74 made of rubber, and the pressure in the intake passage is detected by a pressure detection surface in the case 71 of the pressure sensor 35. A cable (not shown) is connected to a connector 73 of the pressure sensor 35, and a detection result of the pressure sensor 35 is output to a control unit through the cable. The detection result of the pressure sensor 35 is used for feedback control of a fuel injection amount.

As shown in FIGS. 3 and 4, the pair of intake pipes 32 is formed by inserting a flange plate 52 made of metal into a front end of a pipe 51 made of rubber. The flange plate 52 is covered with rubber except for a front surface thereof, and an O-ring 53 is mounted in an annular groove in the front surface of the flange plate 52 so as to surround an outlet of the intake passage. Attachment holes 54 are formed on both left and right sides of the flange plate 52, and the front surface of the flange plate 52 is screwed to the rear surface of the cylinder head 43 (see FIG. 2) by the attachment holes 54. A flat support base 55 is formed on an upper portion of the flange plate 52, and a welding nut 56 (attachment portion) and a nipple 57 are provided on an upper surface of the support base 55.

The arm member 61 made of resin that supports the pressure sensor 35 in a cantilever manner is provided on the upper surface of the support base 55. A base end portion 62 of the arm member 61 is fixed to the welding nut 56 by a bolt 65, and a tip end portion 63 of the arm member 61 is separated upward from the intake pipe 32. A protrusion portion 64 for holding the pressure sensor 35 is formed on the tip end portion 63 of the arm member 61, and the protrusion portion 64 is inserted into a through hole of the case 71 of the pressure sensor 35. The protrusion portion 64 is a snap-fit protrusion, and the through hole of the pressure sensor 35 is easily fitted into the protrusion portion 64. The pressure sensor 35 is easily attached to the intake pipe 32 via the arm member 61.

The pressure sensor 35 is formed in a substantially L-shape in a top view by the case 71 and the connector 73. The pressure detection surface is built in a front side of the case 71, and the through hole is formed in a rear side of the case 71. An upper end of the hose 74 made of rubber is connected to a lower surface of the front side of the case 71, and a lower end of the hose 74 is connected to the nipple 57 on the support base 55. The intake passage of the intake pipe 32 is connected to the inside of the case 71 through the nipple 57 and the hose 74. A rear side of the pressure sensor 35 is held by the protrusion portion 64 of the arm member 61, and a front side of the pressure sensor 35 is supported from below by the hose 74.

Although engine vibration is transmitted from the cylinder head 43 to the intake pipe 32, the engine vibration transmitted from the intake pipe 32 to the pressure sensor 35 is suppressed by the arm member 61 made of resin and the hose 74 made of rubber. The engine vibration is absorbed by the spring property of the cantilever arm member 61 and the flexibility of the hose 74, and the pressure sensor 35 is stably supported by the arm member 61 and the hose 74. Further, an outer surface of the support base 55 is covered with a rubber film, the rubber film is interposed between the support base 55 and the base end portion 62 of the arm member 61, and the engine vibration transmitted from the intake pipe 32 to the arm member 61 is absorbed by the rubber film.

In addition, the welding nut 56 and the nipple 57 on the support base 55 are adjacent to each other in a vehicle width direction orthogonal to a center line C of the intake passage of the intake pipe 32. The arm member 61 is fixed to the welding nut 56, the arm member 61 extends obliquely rearward from the welding nut 56, and the protrusion portion 64 of the arm member 61 is located behind the nipple 57. In the top view, the protrusion portion 64 of the arm member 61, the nipple 57, and the hose 74 are disposed on the center line C of the intake passage of the intake pipe 32. As described above, the arm member 61, the hose 74, the welding nut 56, and the nipple 57, which are related components of the pressure sensor 35, are compactly disposed on the intake pipe 32.

In particular, since the welding nut 56 and the nipple 57 are adjacent to each other in the vehicle width direction, a front-rear width of the related components of the pressure sensor 35 is reduced, and the pressure sensor 35 is accommodated within a front-rear length of the intake pipe 32. A layout of an injector 85 or the like of the throttle body 33 is not hindered by the related components of the pressure sensor 35, and the pressure sensor 35 or the like does not interfere with the injector 85. In addition, since the protrusion portion 64 and the nipple 57 are aligned on the center line C, the pressure sensor 35 is disposed on an inner side of the intake pipe 32 than the welding nut 56, that is, at the center of the intake pipe 32. It is possible to secure the gap between the pressure sensor 35 and another intake system component.

Front ends of a pair of cylindrical portions 81 of the throttle body 33 are inserted into rear ends of the pipes 51 made of rubber of the pair of intake pipes 32. A clamp 82 is provided on an outer peripheral surface of the pipe 51 made of rubber, the pipe 51 is fastened to the cylindrical portion 81 from the outside by the clamp 82, and the throttle body 33 is fixed to the pair of intake pipes 32. A shaft (not shown) is pivotally supported inside the throttle body 33, and a pair of throttle valves 83 for opening and closing the intake passages of the pair of cylindrical portions 81 is attached to the shaft. A motor 84 for driving the shaft is fixed to a right side surface of the throttle body 33.

A pair of injectors 85 is attached to upper surfaces of the pair of cylindrical portions 81, and a delivery pipe 86 is connected to the pair of injectors 85. The pair of injectors 85 penetrates the cylindrical portions 81, and the pair of injectors 85 is inclined so as to face downstream ends (front ends) of the pair of intake pipes 32. The fuel is supplied from the delivery pipe 86 to the pair of injectors 85, and the fuel is injected from the pair of injectors 85 toward the pair of intake ports (not shown) on the downstream side of the pair of intake pipes 32. The pair of injectors 85 is disposed behind a pair of pressure sensors 35, and sufficient gaps are secured between the injectors 85 and the pressure sensors 35.

As shown in FIG. 5, a pair of engine suspension portions 47 is provided on the rear surface of the cylinder head 43 on outer sides in the vehicle width direction with the pair of intake pipes 32 interposed therebetween. In the top view, the pair of pressure sensors 35 is disposed between the pair of engine suspension portions 47, that is, in a space surrounded by the rear surface of the cylinder head 43 and the pair of engine suspension portions 47. A dead space is formed between the pair of engine suspension portions 47, and the dead space is effectively used as an arrangement space of the pair of pressure sensors 35. Accordingly, a sufficient gap is secured between the pair of pressure sensors 35 and another intake system component.

As shown in FIG. 6, the pressure sensor 35 is disposed below the upper end of the cylinder head cover 44 and above the engine suspension portion 47 in a side view. Since the pressure sensor 35 is disposed above the engine suspension portion 47, the pressure sensor 35 is easily detached and the maintainability is improved. The engine suspension portion 47 is supported at the main frame 12 by an engine suspension bracket 19 (see FIG. 1). The pressure sensor 35 is covered from a side by the engine suspension bracket 19, and the pressure sensor 35 is protected by the engine suspension bracket 19 from foreign matter or the like scattered from the side.

In the side view, the pressure sensor 35 is disposed on the base end side (front side) with respect to the tip end of the engine suspension portion 47. Although the pressure sensor 35 and the injector 85 are disposed at substantially the same height, since the pressure sensor 35 does not protrude in the direction from the tip end of the engine suspension portion 47, the pressure sensor 35 does not interfere with the injector 85 behind the engine suspension portion 47. In addition, it is easy to secure the gap between the pressure sensor 35 and another intake system component. By securing the gap between the pressure sensor 35 and another intake system component, it is easy to secure a wiring route such as a cable connected to the connector 73 of the pressure sensor 35.

Figure 7A:
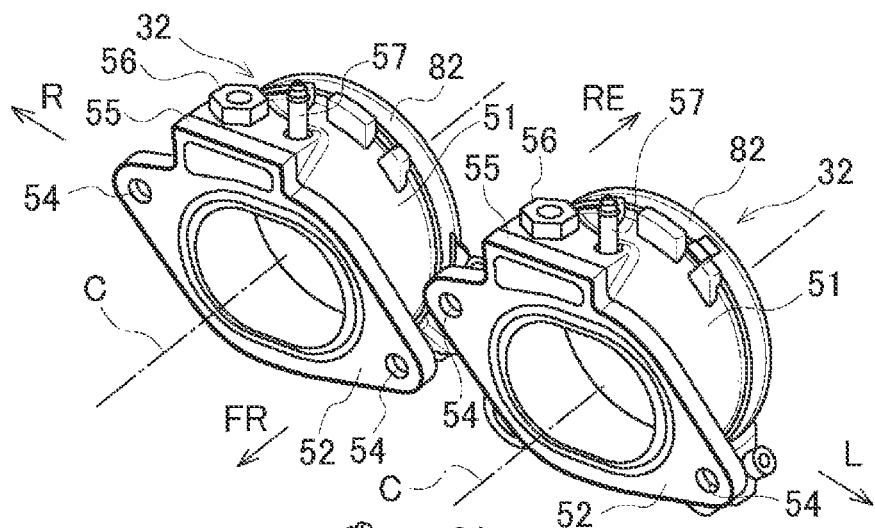
FIGS. 7A to 7C is a view showing an assembling operation of the pressure sensor according to the present embodiment.
Figure 7B:
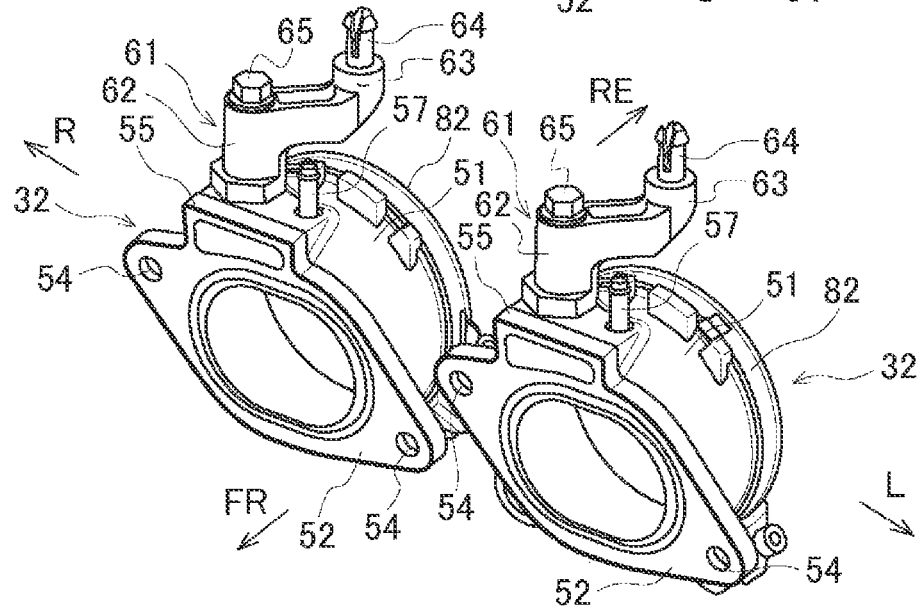
Figure 7C:
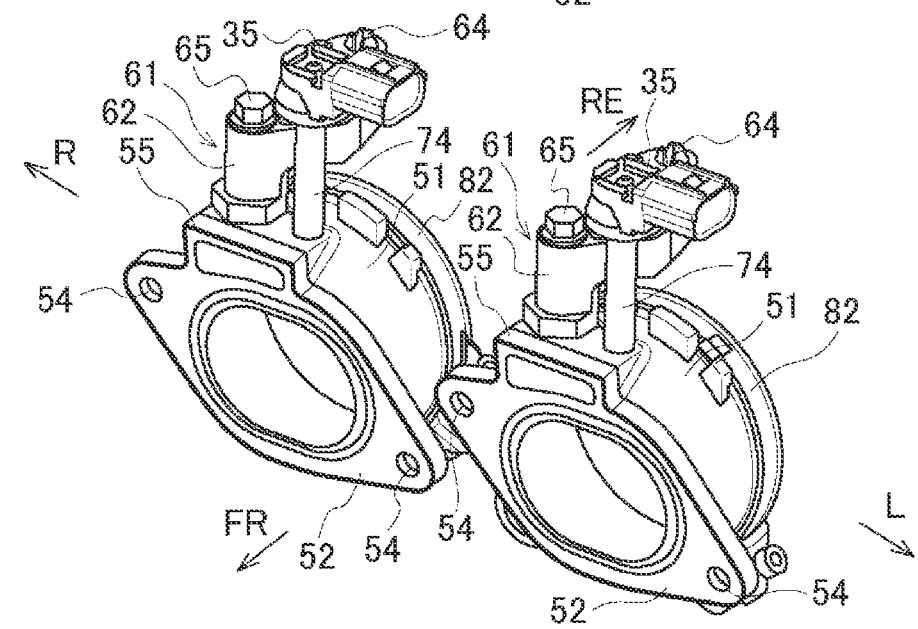

An assembling operation of the pressure sensor will be described with reference to FIGS. 7A to 7C. FIGS. 7A to 7C are views showing the assembling operation of the pressure sensor according to the present embodiment.

As shown in FIG. 7A, the support base 55 is formed on the upper surface of the intake pipe 32, and the welding nut 56 and the nipple 57 are provided on the upper surface of the support base 55. The surface of the support base 55 is covered with the rubber film, but the welding nut 56 and the nipple 57 protrude upward from the rubber film. The welding nut 56 and the nipple 57 are adjacent to each other in the vehicle width direction, the welding nut 56 is disposed to the right of the center line C of the intake pipe 32, and the nipple 57 is disposed directly above the center line C of the intake pipe 32. The nipple 57 penetrates the support base 55, and a pipe line of the nipple 57 is connected to the intake passage.

As shown in FIG. 7B, the arm member 61 is attached to the welding nut 56 on the support base 55. In this case, a fitting hole (not shown) is formed in a lower surface of the base end portion 62 of the arm member 61, and the fitting hole of the base end portion 62 is fitted into the welding nut 56 from above. By fitting the welding nut 56 into the fitting hole of the base end portion 62, the arm member 61 is positioned such that the protrusion portion 64 of the arm member 61 is located directly behind the nipple 57. The bolt 65 is inserted into the base end portion 62 of the arm member 61 from above, and the bolt 65 is fastened to the welding nut 56, such that the arm member 61 is fixed to the intake pipe 32.

As shown in FIG. 7C, the pressure sensor 35 is attached to the protrusion portion 64 of the arm member 61. In this case, since the protrusion portion 64 of the arm member 61 has a snap-fit structure, the pressure sensor 35 is attached to the arm member 61 with a one-touch operation by inserting the protrusion portion 64 into the through hole on the rear side of the pressure sensor 35. In addition, the lower end of the hose 74 is mounted in the nipple 57, and the upper end of the hose 74 is connected to the front side of the pressure sensor 35. When the pressure sensor 35 is attached to the intake pipe 32 in this manner, the pressure sensor 35 is screwed to the rear surface of the cylinder head 43 (see FIG. 5) at the attachment holes 54 on both the left and right sides of the flange plate 52 of the intake pipe 32.

As described above, according to the present embodiment, the intake pipe 32 is assembled to the engine 31 in a state where the pressure sensor 35 is attached to the intake pipe 32. Therefore, the pressure sensor 35 and the intake pipe 32 can be easily assembled to the engine 31. In addition, since the pressure sensor 35 is attached to the intake pipe 32, it is possible to sufficiently secure the gap between the pressure sensor 35 and another intake system component even in a narrow space between the engine 31 and the air cleaner 34.

In the present embodiment, the pressure sensor is attached to the intake pipe via the arm member, but the pressure sensor may be directly attached to the intake pipe.

In addition, in the present embodiment, the intake pipe is provided with a welding nut as an attachment portion, but the attachment portion may be formed so as to be able to attach the pressure sensor. In addition, the attachment portion is not limited to the upper surface of the intake pipe, and the attachment portion may be provided at any position on the outer peripheral surface of the intake pipe as long as a gap between the pressure sensor and another intake system component can be secured.

Further, in the present embodiment, the pressure in the intake passage of the intake pipe is detected by the pressure sensor, but a pressure in an intake passage of a throttle valve may be detected by the pressure sensor. In this case, a nipple is formed in the throttle valve, and the pressure sensor and the nipple are connected via a hose.

In addition, in the present embodiment, the attachment portion and the nipple are adjacent to each other in the vehicle width direction, but a positional relationship between the attachment portion and the nipple is not particularly limited as long as the gap between the pressure sensor and another intake system component can be secured.

In addition, in the present embodiment, a protrusion portion is located at the rear of the nipple, but a positional relationship between the nipple and the protrusion portion is not particularly limited as long as the gap between the pressure sensor and another intake system component can be secured. Therefore, the nipple and the protrusion portion may not be located on a center line of the intake pipe.

In addition, in the present embodiment, the pressure sensor is disposed between the pair of engine suspension portions in the top view, and the pressure sensor is disposed below the upper end of the engine and above the engine suspension portions in the side view. However, the positional relationship between the engine suspension and the pressure sensor is not particularly limited as long as the gap between the pressure sensor and another intake system component can be secured.

In addition, the intake device of the present embodiment may be applied not only to the straddle-type vehicle shown in the drawings but also to other types of straddle-type vehicles. The straddle-type vehicle is not limited to general vehicles on which a rider rides in a posture of straddling a seat, and includes a small-sized scooter-type vehicle on which a rider rides without straddling a seat.

As described above, the intake device of the present embodiment is an intake device, in which the air cleaner (34) is disposed behind the engine (31) and which is configured such that air is introduced from the air cleaner to the engine through the intake passage. The intake device includes: the pressure sensor configured to detect a pressure in the intake passage; the throttle body (33) that forms an upstream side of the intake passage; and the intake pipe (32) that forms a downstream side of the intake passage. An attachment portion (the welding nut 56) to which the pressure sensor is attached is formed on an outer peripheral surface of the intake pipe. According to this configuration, the intake pipe is assembled to the engine in a state where the pressure sensor is attached to the intake pipe. Therefore, the pressure sensor and the intake pipe can be easily assembled to the engine. In addition, since the pressure sensor is attached to the intake pipe, it is possible to sufficiently secure a gap between the pressure sensor and another intake system component even in a narrow space between the engine and the air cleaner.

In the intake device of the present embodiment, the attachment portion is formed on an upper surface of the intake pipe. According to this configuration, the pressure sensor is attached to the upper surface of the intake pipe, such that the assemblability of the pressure sensor can be improved and the gap between the pressure sensor and another intake system component can be secured.

In the intake device of the present embodiment, a nipple (57) connected to the downstream side of the intake passage is provided on the upper surface of the intake pipe, the pressure sensor is connected to the nipple via a hose (74), and the nipple is adjacent to the attachment portion in a vehicle width direction. According to this configuration, the pressure on the downstream side of the intake passage is detected by the pressure sensor through the hose. In addition, the related components of the pressure sensor are disposed in a compact manner. In particular, since the nipple and the attachment portion are adjacent to each other in the vehicle width direction, the front-rear width of the related components of the pressure sensor is reduced, the layout of the injector or the like of the throttle body is not hindered by the related components of the pressure sensor, and the pressure sensor or the like does not interfere with the injector.

The intake device of the present embodiment includes the arm member (61) made of resin that is configured to support the pressure sensor in a cantilever manner. A base end portion (62) of the arm member is fixed to the attachment portion, a protrusion portion (64) configured to hold the pressure sensor is formed at a tip end portion (63) of the arm member, and the protrusion portion is located behind the nipple. According to this configuration, the engine vibration transmitted to the pressure sensor is suppressed by the spring property of the arm member made of resin. The pressure sensor is supported from below by the hose extending from the nipple, and the engine vibration transmitted to the pressure sensor is suppressed by the flexibility of the hose. In addition, since the protrusion portion is located behind the nipple, the degree of freedom of arrangement of the nipple and the attachment portion is not hindered by the protrusion portion.

In the intake device of the present embodiment, the protrusion portion and the nipple are disposed on a center line of the intake pipe in a top view. According to this configuration, since the protrusion portion and the hose are arranged on the center line of the intake pipe, the pressure sensor is disposed at the center of the intake pipe, and the gap between the pressure sensor and another intake system component can be secured.

In the intake device of the present embodiment, the engine is provided with a pair of engine suspension portions (47) on outer sides in a vehicle width direction with the intake pipe interposed therebetween, and the pressure sensor is disposed between the pair of engine suspension portions in a top view. According to this configuration, since the pressure sensor is disposed in the dead space between the pair of engine suspension portions, it is possible to secure the gap between the pressure sensor and another intake system component.

In the intake device of the present embodiment, the pressure sensor is disposed below an upper end of the engine and above the pair of engine suspension portions in a side view. According to this configuration, since the pressure sensor is disposed above the pair of engine suspension portions, the pressure sensor is easily detached, and the maintainability is improved.

In the intake device of the present embodiment, the pressure sensor is disposed on a base end side with respect to tip ends of the pair of engine suspension portions in a side view. According to this configuration, since the pressure sensor does not protrude from the tip ends of the pair of engine suspension portions, it is easy to secure the gap between the pressure sensor and another intake system component.

Although the present embodiment has been described, a part or all of the above-described embodiment and modifications may be combined as another embodiment.

The technique of the present invention is not limited to the above-described embodiment, and various changes, substitutions, and modifications may be made without departing from the spirit of the technical idea of the present invention. The present invention may be implemented by other methods as long as the technical idea can be implemented by the methods through advance of the technique or other derivative techniques. Therefore, the scope of the claims covers all embodiments that may be included within the scope of the technical idea.

What is claimed is:

1. An intake device, in which an air cleaner is disposed behind an engine and which is configured such that air is introduced from the air cleaner to the engine through an intake passage, the intake device comprising:
    a pressure sensor configured to detect a pressure in the intake passage;
    a throttle body that forms an upstream side of the intake passage; and
    an intake pipe that forms a downstream side of the intake passage, and
    an attachment portion to which the pressure sensor is attached is formed on an outer peripheral surface of the intake pipe,
    wherein:
        the attachment portion is formed on an upper surface of the intake pipe,
        a nipple connected to the downstream side of the intake passage is provided on the upper surface of the intake pipe, and the pressure sensor is connected to the nipple via a hose, and
        the nipple is adjacent to the attachment portion in a vehicle width direction.

2. The intake device according to claim 1, further comprising:
    an arm member made of resin that is configured to support the pressure sensor at a tip end portion of the arm member, wherein
    a base end portion of the arm member is fixed to the attachment portion, and a protrusion portion configured to hold the pressure sensor is formed at a tip end portion of the arm member, and
    the protrusion portion is located behind the nipple.

3. The intake device according to claim 2, wherein the protrusion portion and the nipple are disposed on a center line of the intake pipe in a top view.

4. The intake device according to claim 1, wherein the engine is provided with a pair of engine suspension portions on outer sides in a vehicle width direction with the intake pipe interposed therebetween, and the pressure sensor is disposed between the pair of engine suspension portions in a top view.

5. The intake device according to claim 4, wherein the pressure sensor is disposed below an upper end of the engine and above the pair of engine suspension portions in a side view.

6. The intake device according to claim 4, wherein the pressure sensor is disposed on a base end side with respect to tip ends of the pair of engine suspension portions in a side view.

* * * * *